US008102905B2

(12) United States Patent
Roovers et al.

(10) Patent No.: US 8,102,905 B2
(45) Date of Patent: Jan. 24, 2012

(54) PULSE DETECTION IN WIRELESS COMMUNICATIONS SYSTEM

(75) Inventors: Raf Lodewijk Jan Roovers, Eindhoven (NL); Harish Kundur Subramaniyan, Eindhoven (NL); Gerard Van Der Weide, Eindhoven (NL)

(73) Assignee: ST-Ericsson SA, Geneva (CH)

(*) Notice: Subject to any disclaimer, the term of this patent is extended or adjusted under 35 U.S.C. 154(b) by 1475 days.

(21) Appl. No.: 10/552,816

(22) PCT Filed: Apr. 13, 2004

(86) PCT No.: PCT/IB2004/050421
§ 371 (c)(1),
(2), (4) Date: Oct. 11, 2005

(87) PCT Pub. No.: WO2004/091161
PCT Pub. Date: Oct. 21, 2004

(65) Prior Publication Data
US 2006/0203936 A1    Sep. 14, 2006

(30) Foreign Application Priority Data

Apr. 14, 2003   (EP) .................................... 03076127
Jul. 30, 2003    (EP) .................................... 03102357

(51) Int. Cl.
*H04B 3/46* (2006.01)
*H04B 17/00* (2006.01)
*H04Q 1/20* (2006.01)
(52) U.S. Cl. ....................................... 375/228; 375/327
(58) Field of Classification Search .................. 375/228, 375/327
See application file for complete search history.

(56) References Cited

U.S. PATENT DOCUMENTS

| | | | | |
|---|---|---|---|---|
| 5,677,927 A * | 10/1997 | Fullerton et al. | ............ | 375/130 |
| 5,986,599 A * | 11/1999 | Matsuo | .................... | 341/158 |
| 7,286,599 B1 * | 10/2007 | Cheah | ...................... | 375/238 |
| 2003/0224747 A1 * | 12/2003 | Anand | ........................ | 455/208 |
| 2004/0141567 A1 * | 7/2004 | Yang et al. | .................. | 375/287 |

FOREIGN PATENT DOCUMENTS

| EP | 1 298 811 A | 4/2003 |
|---|---|---|
| WO | WO 01/93444 A1 | 12/2001 |

OTHER PUBLICATIONS

O'Donnel, I, et al., "An Integrated, Low Power, Ultra-Wideband Transceiver Architecture for Low-Rate, Indoor Wireless Systems", WCNC. IEEE Wireless Communications and Networking Conference, Sep. 4, 2002, p. 1-8.

(Continued)

*Primary Examiner* — David C. Payne
*Assistant Examiner* — Tanmay Shah

(57) ABSTRACT

Pulses are detected in a communications receiver by programming each of a plurality of comparators (44a, 44b, . . . , 44n) with a sampling time point selected from a plurality of sampling time points (58, 60) and with a reference level selected from a plurality of reference levels (54, 56). The received signal is applied to each of the comparators such that each of the comparators produces a respective output signal based on a comparison between the received signal level and the selected reference level at the selected sampling time point. The combinations of sampling time points and reference levels can be selected based on knowledge about the expected arrival times of the pulses, and based on knowledge about the possible shapes of said pulses, with the result that the device can detect received pulses without requiring large amounts of hardware, in a device which has an acceptable power consumption. The communications system may be a signaling system, or a radar or positioning system.

18 Claims, 3 Drawing Sheets

OTHER PUBLICATIONS

International Search Report of the International Searching Authority dated Jul. 26, 2004 in connection with PCT Patent Application No. PCT/IB2004/050421.

Written Opinion of the International Searching Authority dated Jul. 26, 2004 in connection with PCT Patent Application No. PCT/IB2004/050421.

* cited by examiner

PULSE DETECTION IN WIRELESS COMMUNICATIONS SYSTEM

This invention relates to wireless communications, and in particular to a receiver for use in a wireless communication system. More particularly, the invention relates to a device and a method for pulse detection, for example for use in an Ultra Wideband (UWB) wireless communication system. The communication system may be in the form of a signaling system, in which data is sent from a transmitter to a receiver, or it may be in the form of a radar or positioning system, in which a combined transmitter/receiver detects the reflections of signals which it has itself transmitted.

The term Ultra Wideband is used to refer to a number of different wireless communications systems. In one form of an Ultra Wideband (UWB) communication system, a transmitter generates a series of pulses, which are transmitted at radio frequencies. The function of the receiver is then to detect these pulses, in order to be able to extract data from the transmitted signal. For example, each transmitted pulse, or wavelet, may encode one or more bits of transmitted data, with different shaped transmitted pulses encoding different transmitted bits. Alternatively, the transmitted data may be used to modulate the position or phase of the transmitted pulses.

WO 01/93444 discloses a UWB receiver, which achieves synchronization with an incoming signal. A local pulse generated at the receiver is correlated with the received signal, and it is determined that synchronization has been achieved when there is a high degree of correlation.

However, this system has the disadvantage that a considerable time is required to achieve synchronization of the receiver to the incoming signal, and moreover that the receiver requires an accurate timing generator.

The document 'An Integrated, Low-Power, Ultra-Wideband Transceiver Architecture for Low-Rate, Indoor Wireless Systems', published at the IEEE CAS Workshop on Wireless Communications and Networking, September 2002, by O'Donnell et al, proposes an alternative UWB receiver architecture. This document discloses the use of a bank of analog-to-digital converters, which are used to obtain full analog-to-digital conversion of the received signal throughout the pulse period.

However, this has the disadvantage that, in order to be able to achieve the required full analog-to-digital conversion, the power consumption of the device is very high.

An object of the present invention is to provide a receiver architecture which places the minimum requirements on the system hardware.

According to a first aspect of the present invention, there is provided a communications receiver, comprising a pulse detection unit, for detecting pulses in a received signal, the pulse detection unit comprising:

a plurality of comparators;

a sampling time generator, for generating signals indicative of a plurality of sampling time points; and a reference level generator, for generating a plurality of reference levels, wherein each of the comparators is programmable with a sampling time point selected from said plurality of sampling time points and with a reference level selected from said plurality of reference levels, and wherein the received signal is applied to each of the comparators such that each of the comparators produces a respective output signal based on a comparison between the received signal level and the selected reference level at the selected sampling time point.

According to a second aspect of the present invention, there is provided a method of detecting pulses received in a communications receiver, the method comprising:

generating signals indicative of a plurality of sampling time points;

generating a plurality of reference levels;

programming each of a plurality of comparators with a sampling time point selected from said plurality of sampling time points and with a reference level selected from said plurality of reference levels, and applying the received signal to each of the comparators such that each of the comparators produces a respective output signal based on a comparison between the received signal level and the selected reference level at the selected sampling time point.

The above and other objects and features of the present invention will become more apparent from the following detailed description considered in connection with the accompanying drawings in which.

Figure 1:
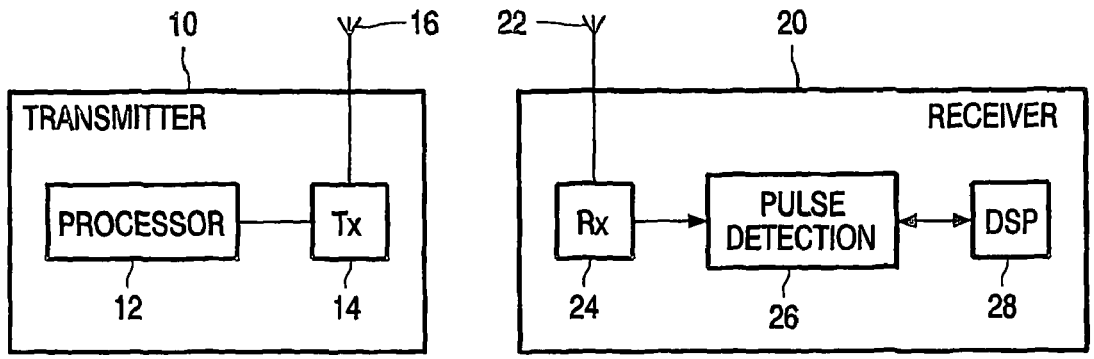
FIG. 1 is a schematic block diagram of a wireless communication system in accordance with the present invention.

FIG. 1 is a schematic block diagram of a communication system in accordance with an aspect of the present invention. Specifically, the system includes a transmitter 10, which includes a processor 12, transmit circuitry 14, and an antenna 16. The processor 12 receives data for transmission, and converts the data into a form which can be handled by the transmit circuitry 14. The transmit circuitry 14 then outputs signals for transmission by the antenna 16. The transmitter 10 may be generally conventional.

The receiver 20 includes an antenna 22, receive circuitry 24, pulse detection circuitry 26, and a digital signal processor 28. Received signals are supplied to the receive circuitry 24, which performs the initial radio frequency processing of the signals. The signals are then applied to pulse detection circuitry 26, which detects the presence of transmitted pulses among the received signals, and a signal representing the detected pulses is then passed to the DSP 28 for further processing.

In the preferred embodiment shown in FIG. 1, therefore, the invention is applied to an Ultra-Wideband (UWB) communications system in the form of a signaling system, in which data is sent from a transmitter to a receiver, although the same principle may be applied to certain other wireless communications systems, including UWB radar and positioning systems, in which a single device incorporates a transmitter for transmitting pulses and a receiver for detecting reflected pulses.

Figure 2:
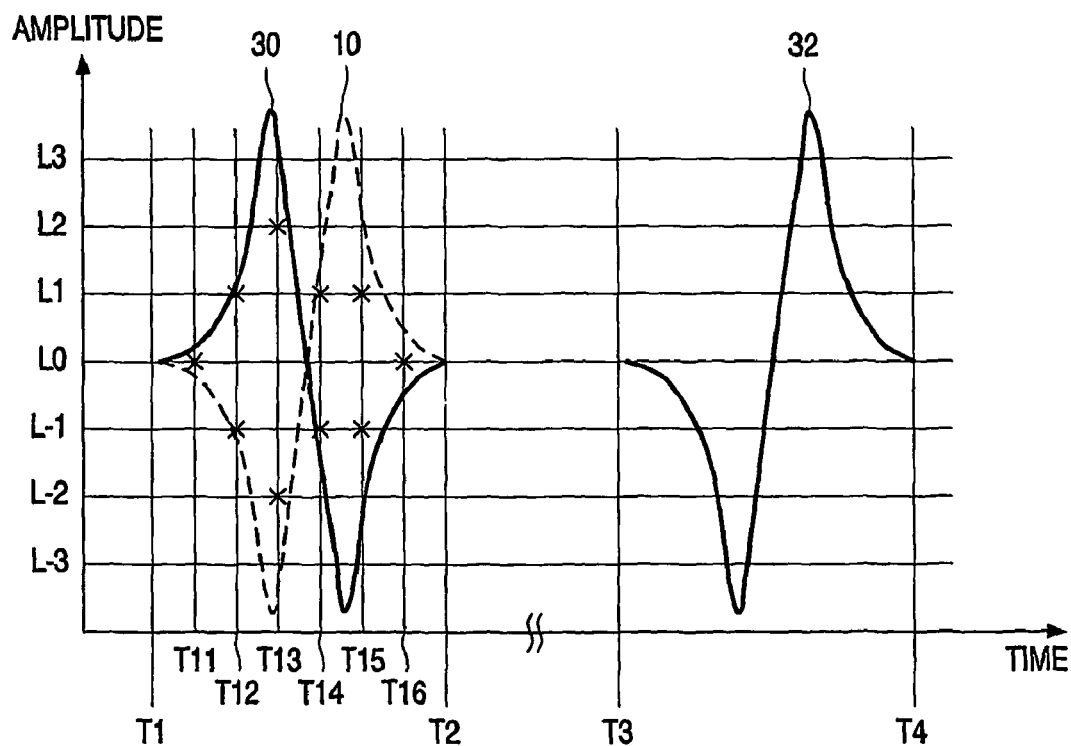
FIG. 2 is a timing diagram, indicating possible signals in the system of FIG. 1.

FIG. 2 is a timing diagram showing one possible form of signals which may be transmitted in a UWB system. Specifically, the transmitter 10 transmits a series of pulses 30, 32. It will be apparent that, while only two such pulses are shown in FIG. 2 for ease of illustration and explanation, a transmission usually contains a very large number of such pulses.

It should also be appreciated that FIG. 2 shows the form of signals as they are transmitted. Distortion and noise in the wireless channel between the transmitter and receiver, as well as distortions introduced in the transmitter and receiver to a smaller extent, will mean that the received signals will not be exactly as transmitted. A function of the receiver is to determine the form of the transmitted signals, using the available information about the received signals.

In FIG. 2, a first pulse 30 extends from a time T1 until a time T2, and a second pulse 32 extends from a time T3 until a time T4. The duration of each pulse, that is, the time intervals (T1,T7) and (T3,T4), are typically of the order of a few nanoseconds or less. By contrast, the interval between pulses, that is, the time interval (T1,T3), is typically of the order of tens or hundreds of nanoseconds.

The modulation of the successive pulses allows the transmitted signal to contain information, which can be retrieved in the receiver. In this simplified example, the pulses 30, 32 shown in FIG. 2 are of different shapes, which may for example represent a transmitted binary 0 and a transmitted binary 1 respectively. The data for transmission is encoded into the succession of different shaped pulses, and the pulse detection circuitry 26 in the receiver 20 can detect whether each pulse represents a binary 0 or a binary 1, and can output this information to the DSP 28.

The invention is of course applicable to any suitable type of modulation, for example pulse position modulation, bi-phase modulation, or pulse amplitude modulation.

Figure 3:
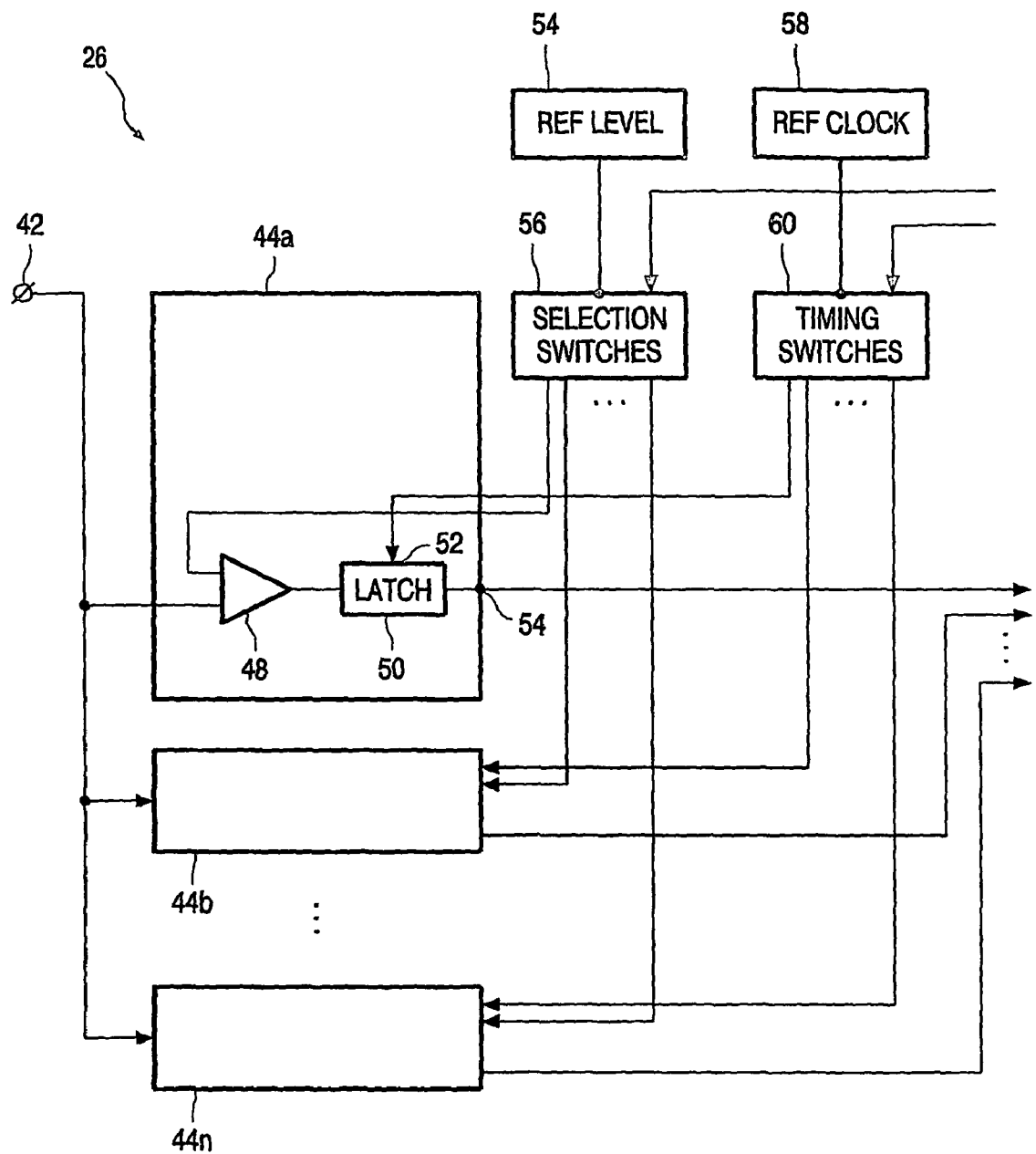
FIG. 3 is an enlarged schematic block diagram of a part of the receiver in the system of FIG. 1.

FIG. 3 is a schematic block diagram of the pulse detection circuitry 26 within the receiver 20.

The pulse detection circuitry 26 has an input 42, which receives the signal from the receiver front-end circuitry 24. The received signal is supplied in parallel to a group of latch circuits 44a, 44b, . . . , 44n, of which only the first is shown in detail in FIG. 3.

The received signal from the input 42 and a reference signal are applied to a pre-amplifier 48. The output from the pre-amplifier 48 is applied to a first side of a latch 50. A timing signal is applied to a control input 52 of the latch and, at the time when the timing signal is received, an output 54 of the latch provides a signal which indicates whether the received signal is higher or lower than the threshold level set by the reference signal.

A current source may be provided within the latch circuit 44a However, advantageously, a single current reference can drive the bias current to the pre-amplifiers 48 and the latches 50 in each of the latch circuits 44a, 44b, . . . , 44n.

The pulse detection circuitry includes a reference level setting block 54, which may for example comprise a resistive ladder providing a plurality of available reference levels, and reference selection switches 56, which can supply a respective reference level, selected from among the available reference levels, to each of the latch circuits 44a, 44b, . . . , 44n.

The pulse detection circuitry 26 also includes a reference clock 58, which acts as a timing delay generator, and timing selection switches 60, which supply a suitable respective timing signal to each of the latches 44a, 44b, . . . , 44n. The reference clock generating circuit 58 is preferably based on a voltage controlled oscillator (VCO), locked by a phase locked loop (PLL) to an external reference, and a delay locked loop (DLL), which allows finely separated timing signals to be generated.

In this preferred embodiment of the invention, the reference selection switches 56 and the timing selection switches 60 are controlled by inputs received from the DSP 28.

In the case of the illustrative received signal shown in FIG. 2, the reference level generating circuitry 56 provides seven available reference levels L-3, L-2, L-1, L0, L1, L2 and L3, and the reference clock generating circuit 58 provides six possible time sampling points during the first pulse 30, namely T11, T12, T13, T14, T15 and T16. Although not shown in FIG. 2, the reference clock generating circuit 58 similarly provides six possible time sampling points during the second pulse 32, and each subsequent pulse.

Any convenient numbers of reference levels and time sampling points can be provided, depending on the required resolution of the output measurements.

During the first pulse 30, each of the latch circuits 44a, 44b, . . . , 44n is then provided with a selected one of the reference levels and a selected one of the possible sampling times. The latch circuits 44a, 44b, . . . , 44n therefore act as comparators and each latch provides an output signal at its respective output 54, indicating whether or not the level of the received signal exceeds that threshold level at that time point The output signals from the respective outputs 54 of the latches 44 are then supplied to the DSP 28.

The invention proceeds from the realization that, in order to successfully detect the received pulses, it is not necessary to perform full analog-to-digital conversion of the received signal. Rather, it is sufficient to obtain outputs from the comparators at a subset of the possible threshold levels and time points. For example, in the illustrative example shown in FIG. 2, the seven available reference levels L-3, L-2, L-1, L0, L1, L2 and L3, and the six possible time sampling points T11, T12, T13, T14, T15 and T16 would provide 42 possible combinations of a reference level and a time sampling point.

However, it is in fact only necessary to obtain comparison outputs from a very much smaller number of comparators, each programmed with one of the seven available reference levels and one of the six possible time sampling points, to be able to distinguish between the possible transmitted signals with a high degree of certainty.

The required number of comparators depends on the modulation scheme of the transmitted signals, with more comparators being required for more complex modulation schemes. Also, providing additional comparators allows the receiver to obtain information about the received pulse shape and the amplitude of the pulse.

FIG. 2 shows an example of how this is achieved. For ease of illustration, FIG. 2 shows not only the transmitted pulse 30, but also, superimposed thereon in dashed lines, the alternative pulse shape 70 which may have been transmitted at that time. Again, it must be noted that the actual received signal will not be exactly the same as either of the possible transmitted pulses 30, 70. However, the receiver must operate to determine with a high degree of probability which of the pulses 30, 70 is more likely to have been transmitted at that time, based on the actual received signal.

In this illustrative example, ten comparators are each programmed with one of the seven available reference levels and one of the six possible time sampling points, these combinations being marked with a cross in FIG. 2. Thus, a first comparator is programmed with reference level L0 and time sampling point T11, a second comparator is programmed with reference level L1 and time sampling point T12, a third comparator is programmed with reference level L-1 and time sampling point T12, and so on. It will usually be required to program at least two comparators with different reference levels and a shared time sampling point, for at least some of the available time sampling points.

It can be seen that, for each of the programmed combinations, the pulse 30 will be expected to produce a particular comparator output, while the pulse 70 will be expected to produce the opposite comparator output. Although these results are subject to the effects of distortion, the outputs from all ten comparators should produce an acceptably reliable determination as to which of the two possible pulses was transmitted.

As mentioned above, providing two additional comparators, programmed with reference level L3 and time sampling point T13, and with reference level L-3 and time sampling point T13 respectively, would allow the receiver to obtain additional information about the pulse amplitude.

The reference level and the sampling point programmed in each comparator can be chosen using any available knowledge about the expected pulse, for example concerning its expected amplitude or arrival time, and about the possible forms of pulse modulation. The available information will differ, depending on whether the receiver is used in a signaling communication system, or a radar or positioning system.

During an initial acquisition phase of operation of the pulse detection circuit 26, when no pulses have yet been detected, there may be no information available about the expected amplitude or arrival time. Therefore, during this phase of operation, it may be necessary to select sampling points which are relatively widely spaced, in order to give a high probability that one of the sampling points will in fact occur during a pulse period. Moreover, it may be preferable to set relatively high initial threshold values, and then reduce the threshold values over time, to ensure that it is the received pulses which are detected, as intended, rather than noise signals.

Figure 4:
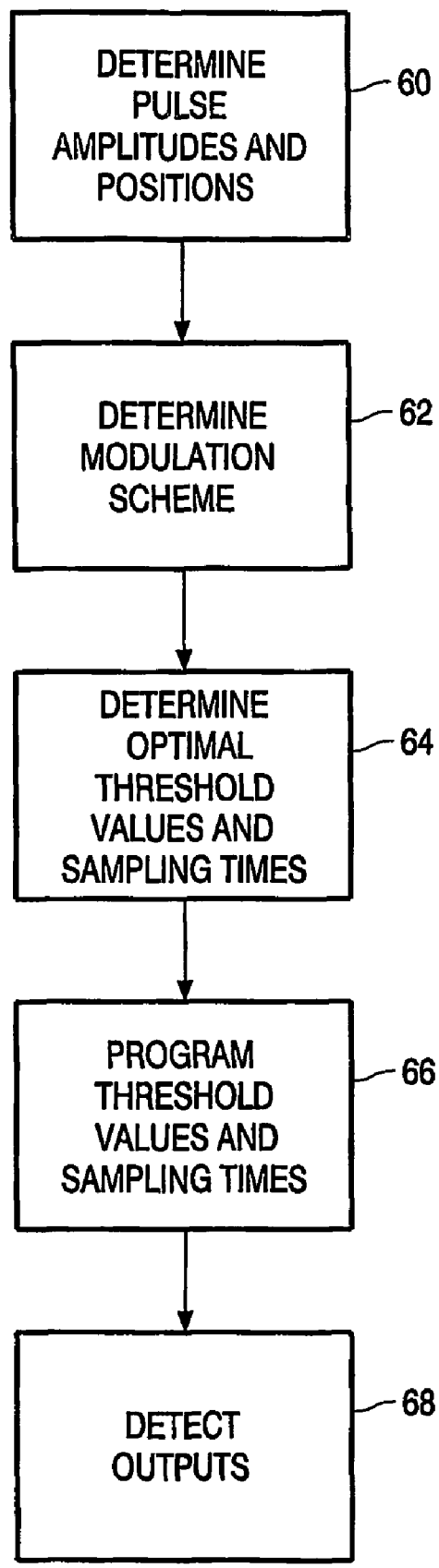
FIG. 4 is a flow chart illustrating the method of operation of the device shown in FIG. 3.

FIG. 4 is a flow chart, showing a method of operation of the pulse detection circuit 26 after the initial acquisition phase, at a time when information is available about the expected amplitude and arrival time of the pulses.

In step 60, the amplitude and arrival time of the pulses is determined, for example as described above. This knowledge is used in choosing combinations of threshold values and sampling points which provide information which is actually useful in detecting pulses and distinguishing between possible transmitted pulse shapes. Thus, it becomes possible to choose threshold values which are less than, but of a comparable magnitude to, the maximum pulse amplitude. Similarly, it becomes possible to choose sampling points which lie within the time periods when pulses are being received, that is, within the time period (T1,T2) rather than the time period (T2,T3) in FIG. 2, for example.

In step 62, the modulation scheme which is in use is determined. For example, the receiver 20 may be able to receive signals from multiple transmitters, or from one transmitter which can use different modulation schemes.

In step 64, optimal threshold values and sampling points are determined. Knowledge about the modulation scheme, that is, about the shapes of the pulses which are transmitted, allows the selection of threshold values and sampling points which can distinguish between the possible transmitted pulse shapes with the required high probability. For example, in the case of the pulses 30, 32 shown in FIG. 2, the signal magnitude at time T11 will be lower than L3 irrespective of which of the two pulses is being received in the time period (T1,T2). Therefore, the combination of the threshold value L3 and the sampling point T11 would not be selected, because it would not help to distinguish between the two possible transmitted pulse shapes.

Each of the available sampling points may be programmed into one or more of the latches. A sampling point may be programmed into more than one of the latches, in combination with different threshold values, although the degree of loading of the timing position generator places a limit on the maximum number of latches which can be programmed with a single time sampling point.

The fact that the threshold values and sampling points are selected, while taking the modulation scheme into account, means that the receiver is extremely flexible.

Another factor to be taken into consideration is that, with appropriate selection of the threshold values and sampling points, the comparator outputs can be used to determine more precisely the exact time position and amplitude of the received pulse, and hence can be used to optimize the prediction of the amplitudes and arrival times of future pulses.

In step 66, the latch circuits 44*a*, 44*b*, . . . , 44*n* are programmed with the selected combinations of threshold values and sampling points and, in step 68, the resulting comparator outputs are generated, and transmitted to the DSP 28.

Based on the comparator outputs received during one pulse, the DSP 28 can predict which of the possible transmitted pulses is the most likely to have been received. The transmitted information can then be extracted from the detected pulse, and used in the further processing of the signal.

Thus, each of the latches 44*a*, 44*b*, . . . , 44*n* is programmed with a selected combination of a threshold value and a sampling point during each pulse. The latches shown in FIG. 3 have the advantage that they can react quickly (for example having an acquisition time of the order of 50 ps). This also means that the latches only need to be biased for a short time before the pulse is received, thereby reducing the power dissipation of the circuit. The bias references supplied to the latches 44*a*, 44*b*, . . . , 44*n* may also be supplied to the signal pre-amplifier, avoiding the need for duplication of components.

However, while the latches need to have a short acquisition time, they are not required to have a short conversion and resetting time. That is because each latch is only required to generate one output signal in each pulse. It is therefore acceptable for the conversion and resetting time of the latch to be of the order of several nanoseconds.

It was mentioned above that received signals may need to be pre-amplified in the receive circuitry 24, before supply to the signal detection unit 26, to ensure that they are of an appropriate magnitude for comparison with the available reference levels. As an alternative to this, the reference level generator 54 may include a variable gain. In that case, depending on the determined pulse amplitude, the available reference levels may be scaled so that they are of an appropriate magnitude for comparison with the received signals. In order to achieve this, the reference level generator 54 may generate the required reference levels by means of a multiplying digital-to-analog converter.

There is therefore provided a pulse detection unit which can detect received pulses without requiring large amounts of hardware, in a device which has an acceptable power consumption.

In summary, in a communications system pulses are detected in a communications receiver by programming each of a plurality of comparators with a sampling time point selected from a plurality of sampling time points and with a reference level selected from a plurality of reference levels. The received signal is applied to each of the comparators such that each of the comparators produces a respective output signal based on a comparison between the received signal level and the selected reference level at the selected sampling time point.

The combinations of sampling time points and reference levels can be selected based on knowledge about the expected arrival times of the pulses, and based on knowledge about the possible shapes of said pulses, with the result that the device can detect received pulses without requiring large amounts of hardware, in a device that has an acceptable power consumption.

The communications system may be a signaling system, or a radar or positioning system.

The invention claimed is:

1. A communications receiver, comprising a pulse detection unit configured to detect pulses in a received signal, the pulse detection unit comprising:
   a plurality of comparators;
   a signal processor;
   a sampling time generator configured to generate timing signals indicative of a plurality of sampling time points within a received pulse; and
   a reference level generator configured to generate a plurality of reference levels,
   wherein each of the comparators is programmable with a sampling time point selected from said plurality of sampling time points and with a reference level selected from said plurality of reference levels, and
   wherein the received signal is applied to each of the comparators such that each of the comparators is configured to produce a respective output signal based on a comparison between the received signal level and the selected reference level at the selected sampling time point,
   wherein the signal processor is configured to detect pulses in the received signal based on the output signals from the comparators and adapted to program the comparators with respective selected sampling time points and reference levels, in order to detect said pulses; and
   wherein each of the sampling time points and reference levels are individually selected according to an expected shape, amplitude, or arrival time of said pulses.

2. The communications receiver as claimed in claim 1, comprising a pre-amplifier configured to pre-amplify the received signal to an appropriate level for comparison with the plurality of reference levels.

3. The communications receiver as claimed in claim 1, wherein the reference level generator is adapted to scale the generated plurality of reference levels for comparison with the received signal.

4. The communications receiver as claimed in claim 1, further comprising a current reference configured to drive bias currents to said plurality of comparators.

5. A method of detecting pulses received in a communications receiver, the method comprising:
   generating timing signals indicative of a plurality of sampling time points within a received pulse;
   programming each of a plurality of comparators with a sampling time point selected from said plurality of sampling time points and with a reference level selected from said plurality of reference levels, each of the plurality of sampling time points and the plurality of reference levels being individually selected according to an expected shape, amplitude, or arrival time of said pulses;
   applying the received signal to each of the comparators such that each of the comparators produces a respective output signal based on a comparison between the received signal level and the selected reference level at the selected sampling time point; and
   detecting pulses in the received signal based on the output signals from the comparators based on respective selected sampling time points and reference levels programmed into the comparators.

6. The method as claimed in claim 5, comprising pre-amplifying the received signal to an appropriate level for comparison with the plurality of reference levels.

7. The method as claimed in claim 5, wherein comprising scaling the generated plurality of reference levels for comparison with the received signal.

8. A pulse detection unit capable of detecting pulses in a received signal, the pulse detection unit comprising:
   a plurality of comparators;
   a signal processor;
   a sampling time generator configured to generate timing signals indicative of a plurality of sampling time points within a received pulse; and
   a reference level generator configured to generate a plurality of reference levels,
   wherein each of the comparators is programmable with a sampling time point selected from said plurality of sampling time points and with a reference level selected from said plurality of reference levels, and
   wherein the received signal is applied to each of the comparators such that each of the comparators is configured to produce a respective output signal based on a comparison between the received signal level and the selected reference level at the selected sampling time point,
   wherein the signal processor is configured to detect pulses in the received signal based on the output signals from the comparators and adapted to program the comparators with respective selected sampling time points and reference levels, in order to detect said pulses; and
   wherein each of the sampling time points and reference levels are individually selected according to an expected shape, amplitude, or arrival time of said pulses.

9. The pulse detector as claimed in claim 8, comprising a pre-amplifier configured to pre-amplify the received signal to an appropriate level for comparison with the plurality of reference levels.

10. The pulse detector as claimed in claim 8, wherein the reference level generator is adapted to scale the generated plurality of reference levels for comparison with the received signal.

11. The pulse detector as claimed in claim 8, further comprising a current reference configured to drive bias currents to said plurality of comparators.

12. The pulse detector as claimed in claim 8, wherein the pulse detector is adapted for use in an ultra wide band communications receiver.

13. The communications receiver as claimed in claim 1, further comprising:
   at least one antenna; and
   receive circuitry configured to perform initial radio frequency processing of the received signal.

14. The communications receiver as claimed in claim 1, wherein a number of the plurality of comparators is based on a modulation scheme of the received signals.

15. The communications receiver as claimed in claim 1, wherein at least two comparators are configured to provide information about at least one of:
   a pulse shape of the received signal; and
   an amplitude of the received signal.

16. The method as claimed in claim 5, comprising determining at least one of:
   a pulse shape of the received signal; and
   an amplitude of the received signal.

17. The pulse detector as claimed in claim 8, wherein a number of the plurality of comparators is based on a modulation scheme of the received signals.

18. The pulse detector as claimed in claim 8, wherein at least two comparators are configured to provide information about at least one of:
   a pulse shape of the received signal; and
   an amplitude of the received signal.

* * * * *